US008732847B2

(12) United States Patent
Keefe et al.

(10) Patent No.: US 8,732,847 B2
(45) Date of Patent: May 20, 2014

(54) ACCESS CONTROL MODEL OF FUNCTION PRIVILEGES FOR ENTERPRISE-WIDE APPLICATIONS

(75) Inventors: Thomas Keefe, Mill Valley, CA (US); Tanvir Ahmed, Hayward, CA (US); Vikram Pesati, San Jose, CA (US); Roger Wigenstam, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 812 days.

(21) Appl. No.: 12/551,217

(22) Filed: Aug. 31, 2009

(65) Prior Publication Data

US 2011/0055918 A1 Mar. 3, 2011

(51) Int. Cl.
*G06F 7/04* (2006.01)
*G06F 7/00* (2006.01)

(52) U.S. Cl.
USPC ........... 726/27; 726/21; 726/28; 707/999.009

(58) Field of Classification Search
USPC ......... 726/2–10, 16–21, 26–30; 707/999.009, 707/999.01
See application file for complete search history.

(56) References Cited

U.S. PATENT DOCUMENTS

| | | | | |
|---|---|---|---|---|
| 2002/0026592 A1* | 2/2002 | Gavrila et al. | ................ | 713/201 |
| 2002/0083059 A1* | 6/2002 | Hoffman et al. | .................. | 707/9 |
| 2002/0184521 A1* | 12/2002 | Lucovsky et al. | ............. | 713/200 |
| 2003/0188198 A1* | 10/2003 | Holdsworth et al. | ......... | 713/201 |
| 2003/0200467 A1* | 10/2003 | Choy et al. | ..................... | 713/202 |
| 2004/0205355 A1* | 10/2004 | Boozer et al. | ................. | 713/200 |
| 2004/0243822 A1* | 12/2004 | Buchholz et al. | ............. | 713/200 |
| 2005/0022029 A1* | 1/2005 | Potter et al. | .................... | 713/201 |
| 2006/0136991 A1* | 6/2006 | Kern | ................................ | 726/2 |
| 2006/0224590 A1* | 10/2006 | Boozer et al. | ..................... | 707/9 |
| 2006/0294578 A1* | 12/2006 | Burke et al. | ....................... | 726/2 |
| 2007/0143855 A1* | 6/2007 | Gilchrist et al. | ................ | 726/26 |
| 2007/0185875 A1* | 8/2007 | Chang et al. | ...................... | 707/9 |
| 2007/0214497 A1* | 9/2007 | Montgomery et al. | ........... | 726/4 |
| 2007/0283443 A1* | 12/2007 | McPherson et al. | ............ | 726/26 |
| 2008/0022370 A1* | 1/2008 | Beedubail et al. | ................ | 726/4 |
| 2009/0006412 A1* | 1/2009 | Wallace et al. | .................... | 707/9 |
| 2009/0144804 A1* | 6/2009 | Idicula et al. | ..................... | 726/2 |
| 2009/0157686 A1* | 6/2009 | Idicula et al. | ..................... | 707/9 |
| 2010/0036846 A1* | 2/2010 | Rafiq et al. | ......................... | 707/9 |
| 2010/0281060 A1* | 11/2010 | Ahmed et al. | ................ | 707/785 |

* cited by examiner

*Primary Examiner* — Darren B Schwartz
(74) *Attorney, Agent, or Firm* — Hickman Palermo Truong Becker Bingham Wong LLP; Zhichong Gu

(57) ABSTRACT

Techniques are provided for access control in a system. A request is received for checking whether a subject has a privilege for a resource. A security class that defines a plurality of privileges that include the requested privilege is determined. One or more access control lists have been configured for the security class. The one or more access control lists comprise one or more access control entries. Each of the one more access control entry defines whether one or more subjects has been granted or denied to zero, one or more of the plurality of privileges defined in the security class. Based on the access control lists configured for the security class, it is determined whether the subject should be granted the privilege for the requested resource.

16 Claims, 4 Drawing Sheets

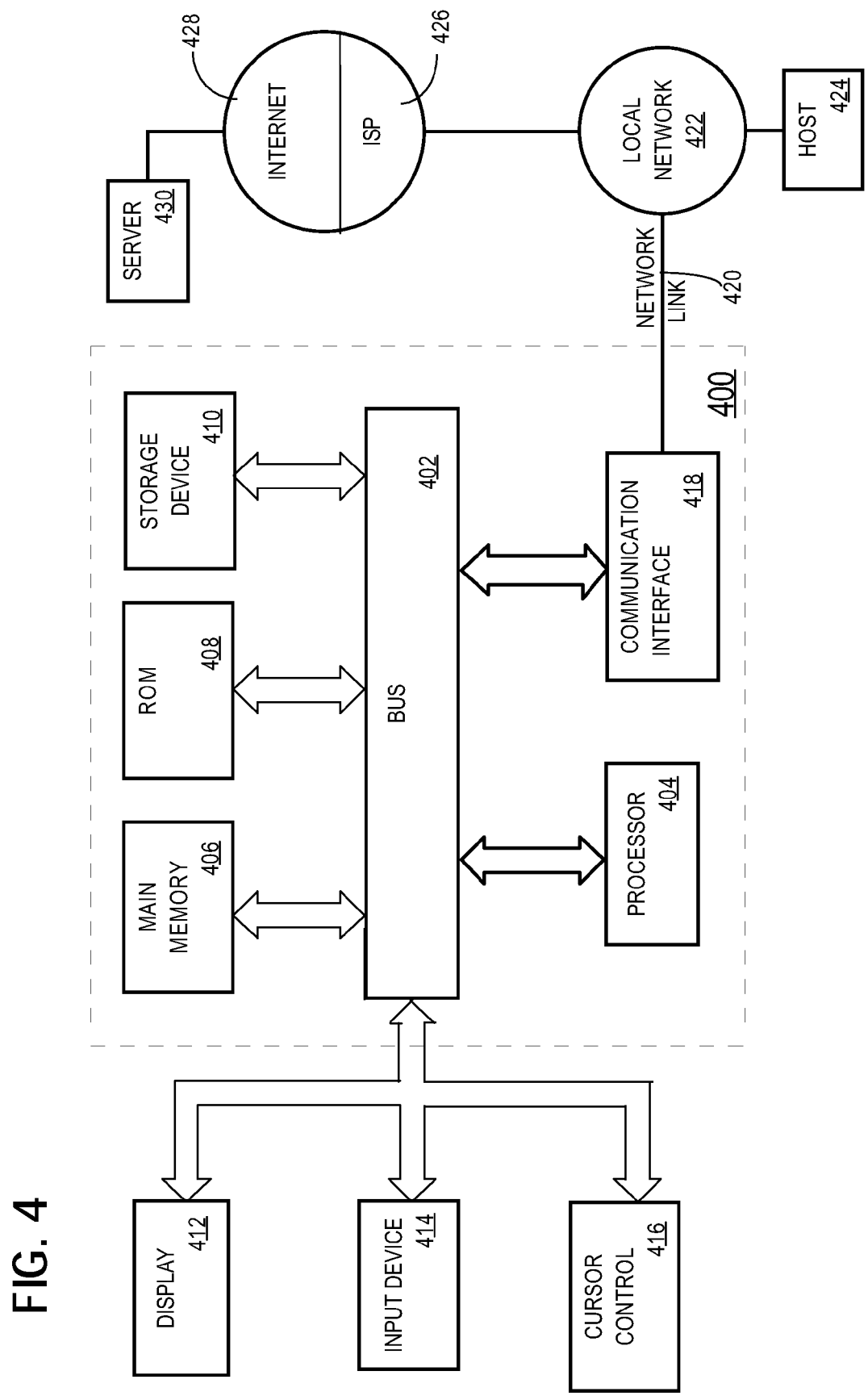

ACCESS CONTROL MODEL OF FUNCTION PRIVILEGES FOR ENTERPRISE-WIDE APPLICATIONS

FIELD OF THE INVENTION

The present invention relates to controlling access to resources in a system, and in particular, to controlling access to functions of applications in an enterprise system.

BACKGROUND

An enterprise system may be made up of many different applications such as customer relationships management (CRM) application, billing application, human resources application, supply chain application, etc. These applications typically need to access one another's resources. As used herein, the term "resource" refers to a function, an operation, or a data object in the system; the function or operation may also access data objects stored in a database system.

Different applications in the same system may implement different access control logic to their respective resources. Under these approaches, if an access control policy is to be added, deleted, or modified in an application, source code for corresponding access control logic must be modified and re-compiled.

An application developer defines application-specific privileges to protect its functions or operations. These privileges are defined and managed independently by each application in its own local-scope. Increasingly there are use cases when applications execute each other's operations in enterprise settings resulting in sharing of privilege definitions and administration of shared operations. In such cases, application developers face the challenge to uniformly define privileges, i.e., with a common understanding of privilege semantics, to protect application functions with an enterprise-wide policy in the global scope.

Under some other approaches, access control policies for resources may be declaratively defined in an enterprise-wide access control list (ACL). Based on the enterprise-wide ACL, access control logic in the system may determine whether any requesting subject has any privilege to access a particular resource. However, it is difficult to define a single enterprise-wide ACL for all the applications in the enterprise system, as these applications may implement different semantics for access control based on different computing products by different development organizations. Even if it is possible to set up a single enterprise-wide ACL in a consistent way, it may be extremely complex and difficult to maintain. For example, coordinating changes to a single global file by various security administrators responsible for different parts of the system is difficult to do in practice.

Furthermore, a single enterprise-wide ACL would take a long time to load at runtime. When a minor change is made to the enterprise-wide ACL, cache entries stored in the system memory may require reloading of a large number of entries in the enterprise-wide ACL, in order to ensure integrity and coherency of all the entries from the single file. This reloading may occur often as minor changes are being made to the single enterprise-wide ACL for various applications.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 is a block diagram of an example hardware system for access control.

DETAILED DESCRIPTION

Figure 1:
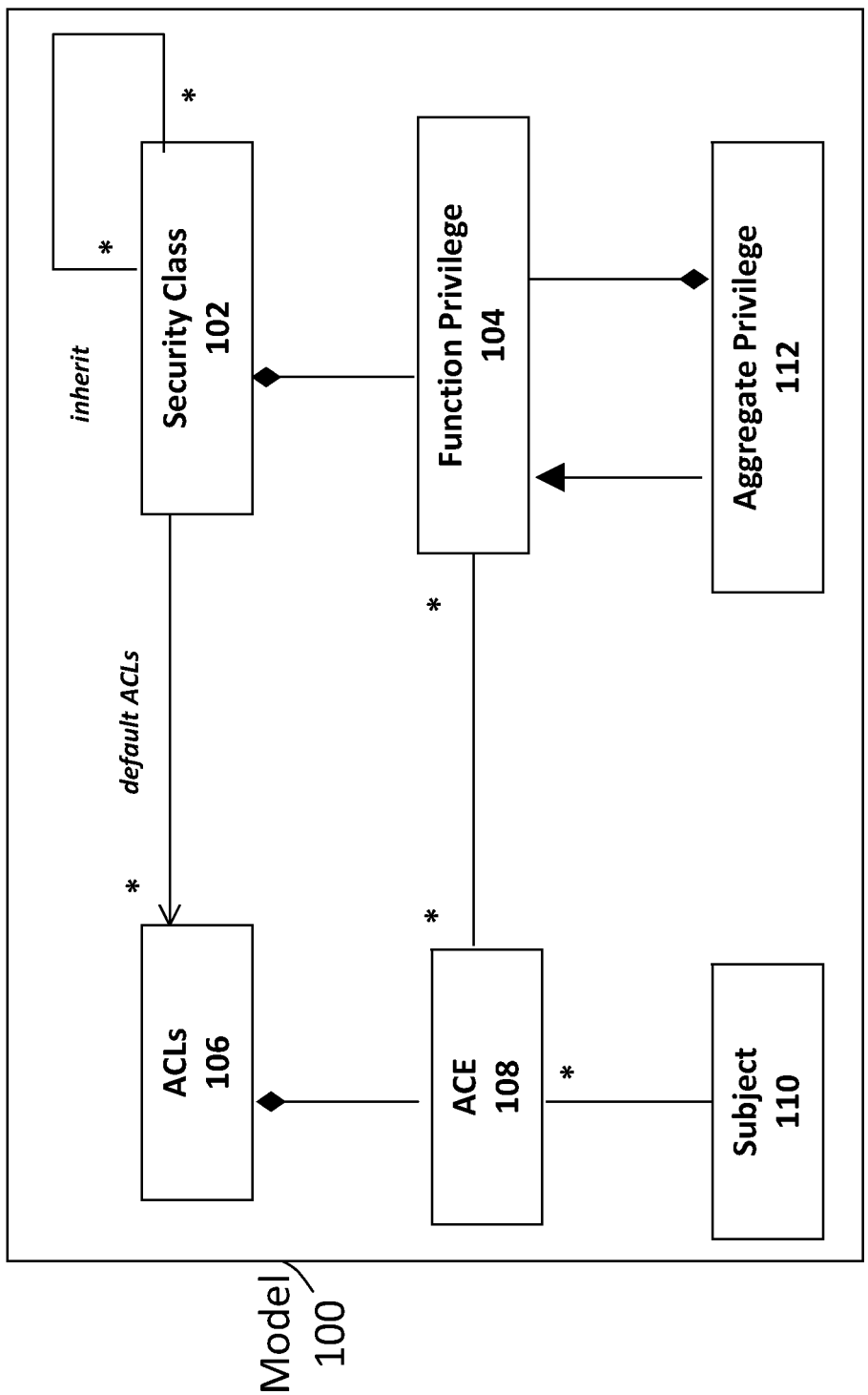
FIG. 1 illustrates an example access control model in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

To determine whether a subject can access a function, access control logic as described herein checks whether the subject has been granted a corresponding privilege. For example, a privilege may be defined for invoking a function "viewCRMInfo" implemented by a CRM application. This function or operation may only be invoked by a subject that is granted the privilege to invoke the function. For example, a subject, such as a Billing application, may invoke the function if the Billing application has been granted the corresponding privilege.

To better organize a large number of privileges in a system, an access control model may be constructed for the system using a number of constructs, as will be further explained in detail later. Instead of using a single access control list (ACL) for a system, multiple ACLs are used. Specifically, privileges in the system are classified into a plurality of security classes. Each of the security classes may be configured with one or more default ACLs. Configuration information for the security classes and the ACLs may be stored as binding information in the system.

Privileges may be classified into security classes in a flexible manner. For example, in some embodiments, resources such as data objects and functions in an enterprise system can be conceptually organized into hierarchical domains. Each domain may represent a particular aspect of the system or an application therein. A security class may be constructed for corresponding privileges for resources in each of these domains. For example, system-wide resources may be placed in a first domain. Privileges corresponding to the system-wide resources may be grouped into a first security class. Similarly, application-wide resources for an application may be placed in a second domain. Privileges corresponding to the resources in the application may be grouped into a second security class. This may hold true for other applications or sub-systems in the enterprise system.

In some embodiments, each default ACL may specify access control entries (ACEs) for a security class. An ACE specifies which subject has which privileges in the security class. ACEs in different ACLs may be cached independently. Thus, if an ACE in an ACL is changed, added or deleted, only the ACL containing the ACE needs to be re-cached.

If an application has many privileges, additional security classes may be defined for the application. Correspondingly, additional default ACLs may be configured for each of the security classes. Thus, the size and number of the ACLs can be easily controlled in the system. Since a change in one ACL does not impact the cache validity of other ACLs, runtime performance of an access control model as described herein is much better than the approach in which a single, monolithic ACL is used. Moreover, access control logic is not required to be application-specific; a common access control semantic may be implemented across all the applications. Of course, an application may still implement its application-specific logic for access control, in addition to or instead of, the common access control semantic.

Database Management System

Systems as described herein may include a database management system. A database management system ("DBMS") manages a database. A database management system may comprise one or more database servers. A database comprises database data and metadata that is stored on a persistent memory mechanism, such as a set of hard disks. Database data may be stored in one or more data containers. Each container contains records. The data within each record is organized into one or more fields. In relational database management systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Database servers manage resources. Such resources may include, for example, data containers such as tables or object classes, or the records stored within the data containers. Other resources include files and directories that store such files. Yet other resources may include functions, and the execution of functions. Although specific resources are described herein as examples, database servers manage numerous other resources, and resources are not limited to the resources explicitly described herein.

Function Privileges, ACLS and Evaluation Rules

As discussed, ACEs in ACLs may specify which subjects have which privileges to access certain functions. As used herein, the term "subject" refers to an identity which may be specified in ACEs in ACLs by administrators to control the subject's access to certain functions in an application. An example of subject may be a role such as an administrator, a user, or a user group to which a user belongs. Subjects may also have other types of identities or attributes that may be specified in ACEs. For example, the application id of an application that request access to a function in another application may be specified as a subject in ACEs. In some embodiments, an ACE may comprise a first field that specifies one or more subjects, a second field that specifies one or more privileges named in a security class, and a third field that specifies whether the subjects are granted or denied the privileges. In some embodiments, other information relating to the creation time, the last modification time, the creator, etc., may also be included in the ACE.

It should be noted that access control logic as described herein does not have to directly implement or provide a function such as "viewCRMInfo". Rather, the access control logic is a gatekeeper, which may return an error code if the subject attempting to invoke a function does not have the requisite privilege to invoke. On the other hand, if the subject does have the privilege, then the access control logic may allow the attempted invocation of the function to continue further to execute the function implemented in an application or the database system.

For example, when an application needs access to a resource, an access checking routine may be explicitly or implicitly invoked first to determine whether the application has been given a specific privilege corresponding to the resource. For example, when the billing application attempts to invoke the function "viewCRMInfo( )", access control logic described herein may implicitly invoke a "checkACL( )" to determine whether the billing application has been given the function privilege to invoke this function, before the function "viewCRMInfo( )" is actually invoked. Based on a lookup table, it may be determined that executing this function requires a function privilege contained in a security class for the CRM application. Furthermore, it may also be determined that this function privilege is protected by one, two, or more ACEs in the default ACLs for the security class, as will be further explained in detail.

If a function privilege is protected by multiple ACEs in the default ACLs, they can be evaluated under an evaluation rule. For example, under a first evaluation rule, a privilege is granted to a subject if all ACEs that protect the same privilege grant access to the subject. Under a second evaluation rule, a privilege is granted to a subject so long as one of the ACEs that protect the privilege grants access to the subject. Under a third evaluation rule, a "deny" specification in an ACE has the precedence over, thus overrules, any "grant" specification in other ACEs. Under a fourth evaluation rule, a "grant" specification in an ACE has the precedence over any "deny" specification in other ACEs. Under the fifth evaluation rule, the first ACE that grants or denies the privilege determines whether the privilege is granted or denied. Under the fifth evaluation rule, after the first grant or deny is encountered, further evaluation of remaining ACEs is not required. Under the sixth evaluation rule, the last ACE that grants or denies the privilege determines whether the privilege is granted or denied. Therefore, under the sixth evaluation rule, all the ACEs that protect the privilege will be evaluated.

It should be noted that, for the purpose of the present invention, other evaluation rules of ACEs may also be used instead of, or in conjunction with, the rules described above. Furthermore, a combination of the foregoing and other evaluation rules may be used so long as the overall evaluation rule, when applied to multiple ACEs, produces a semantically consistent and meaningful outcome in determining whether a privilege should be granted or denied to a requesting subject.

Example Access Control Model

FIG. 1 illustrates an example object model 100 for access control for function privileges in accordance with an embodiment of the present invention.

In some embodiments, a security class 102 can include all function privileges 104 related to an artifact (not shown). As used herein, the term "artifact" refers to the system, an entire application, a subdivision of an application, a web page, a database object, a database transaction, etc. For example, the CRM application may be an artifact. A security class for the CRM application may include all function privileges related to the CRM application. If the CRM application has a first function privilege (e.g., viewCRMInfo) corresponding to a first function "viewCRMInfo( )", a second function privilege (e.g., updateCRMInfo) corresponding to a second function "updateCRMInfo( )", and other function privileges corresponding to other functions in the CRM application, the security class for the CRM application includes all these function privileges in these embodiments.

Each function privilege in a security class may be granted to subjects based on the ACEs in the default ACLs for that security class. For example, ACEs in the default ACLs for a security class that include function privileges of the CRM application may specify that the "viewCRMInfo" function privilege be granted to subjects like the Billing application, and that the "updateCRMInfo" be granted only to a subject like the CRM application itself.

It should be noted that a function privilege, used to control access to a function, does not have to be named the same as the function. For example, an alias different from a function name may be used to denote a function privilege.

An object model described herein allows security classes to easily share function privileges with one another. For example, function privileges in a first security class may be implicitly included in a second security class through an inheritance or containment relationship declaration. The second security class may declare that the first security class as the former's parent security class. With that declaration, privileges in the first security class are automatically included as a part of the second security class. Alternatively and/or optionally, the second security class may declare that it contains an instance of the first security class. As a result, privileges in the first security class are automatically included as a part of the second security class through that contained instance.

Aggregate Privilege

An aggregate privilege is constructed from function privileges. The aggregate privilege comprises one or more function privileges as its constituents. Several semantics can be associated with an aggregate privilege.

First, in some embodiments, an aggregate privilege may be a first class privilege. Here, the term "first class" means that the aggregate privilege is a standalone privilege, a denial or grant of which implies denials or grants of all constituent function privileges; however, denials or grants of all the constituent function privileges do not imply a grant or denial of the aggregate privilege. For example, an aggregate privilege "ag" contains constituent function privileges "p1" and "p2". In this first semantic, a grant or denial of the aggregate privilege "ag" implies grants or denials of all the constituent function privileges "p1" and "p2"; but grants or denials of the constituent function privileges "p1" and "p2" do not imply a grant or denial of the aggregate privilege "ag".

Second, in some other embodiments, an aggregate privilege is only an alias for the group comprising the constituent privileges; the aggregate privilege is not a standalone privilege. In this second semantic, a grant or denial of the aggregate privilege "ag" implies grants and denials of the constituent privileges "p1" and "p2"; conversely, grants or denials of the constituent privileges "p1" and "p2" imply a grant or denial of the aggregate privilege "ag".

In some embodiments, an aggregate privilege may be given a global scope. As used herein, with the global scope, the aggregate privilege may be included in any security class in the system, even if one or more of the constituent function privileges for the aggregate privilege may be included or defined in different security classes.

In some other embodiments, on the other hand, an aggregate privilege may be limited to a local scope. Specifically, when an aggregate privilege is included in a security class, the constituent function privileges are required to be explicitly or implicitly included in the same security class. Therefore, the aggregate privilege in these embodiments can only group the privileges available in the same security class.

Aggregate privileges are declared mainly for the ease of setting up access control policies in the system. For example, instead of using multiple ACEs for individual function privileges, a single ACE may map a subject to an aggregate privilege that contains the function privileges as constituents. In a particular embodiment of these embodiments, an aggregate privilege may or may not group constituent function privileges from different security classes. It should be noted that other possible semantics for an aggregate privilege may also be implemented in the system.

In some embodiments, a security class may define an aggregate privilege as comprising two or more function privileges. ACEs in the default ACLs for the security class may use the aggregate privilege in its grant or denial specifications to certain subjects. An access checking routine described herein may use these ACEs to determine whether a subject has been granted all function privileges related to a requested operation. For example, a requesting application may need to spawn off a target application to execute a number of functions. The function privileges for the functions may be aggregated in an aggregate privilege. The aggregate privilege may be included in a security class for the target application. The access checking routine may determine whether zero or more ACEs are related to the requesting application as a subject and the aggregate privilege for the underlying function privileges. These ACEs may be evaluated using an evaluation rule previously described to determine whether the subject, for example the requesting application, has been granted all the function privileges for the function in the target application.

Aggregate privileges can be used to set up access control policies easily. For example, instead of creating a large number of ACEs specifying access control policies based on individual function privileges, a relatively small number of ACEs based on aggregate privileges can be equivalently specified in the default ACLs.

In addition, because of a relatively small number of ACEs can be defined for a large number of function privileges, the evaluation of ACEs can be efficiently performed. In many instances, the evaluation can be made with a single check of a single aggregate privilege. This is especially useful in the embodiments in which an aggregate privilege is a first class privilege, as a grant of the aggregate privilege obviates the need to check each constituent function privilege individually.

Example System

Figure 2:
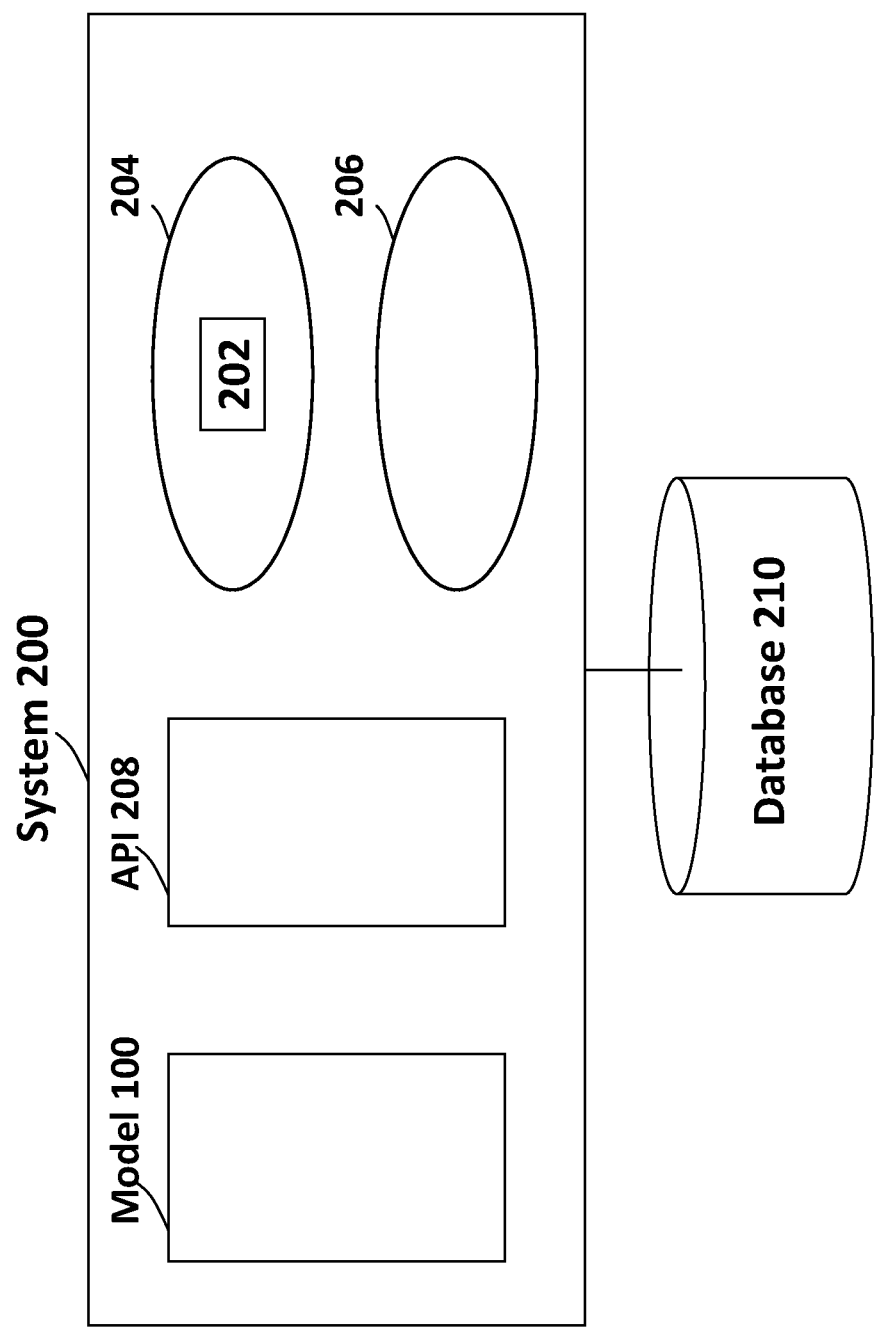
FIG. 2 illustrates an example system for access control in an embodiment.

FIG. 2 illustrates an example system 200 in which an access control object model described herein may be used to perform access control. In some embodiment, a subject 202 such as a requesting application 204 (for example, the Billing application) may wish to access a function in a target application 206 (for example, the CRM application). This function may be "viewCRMInfo( )" in the target application 206. This function may invoke zero or more database operations in a database 210 with which the system 200 is operatively linked.

The subject 202 may be identified by an application id for the requesting application 204, or a user id for a user who is executing the requesting application 204.

A generic access checking routine, for example "check-ACL( )", may be provided as a part of application programming interface (API) 208. In some embodiments, the generic access checking routine in API 208 may be globally accessible to all applications and is automatically invoked when an application requests invocation of a function. In some embodiments, the access checking routine may be invoked whenever a function in the target application 206 is called. In some embodiments, the access checking routine may be invoked whenever a function in a specific module of the target application 206 is called.

For example, when the requesting application 204 requests invocation of the "viewCRMInfo( )" function in the target application 206, the access checking routine may be automatically invoked. An identifier for the subject 202, for example an application id of the requesting application, may be passed to the access checking routine as parameters, environment variables, static or global variables. Additional parameters such as the name of the function may be passed to the access checking routine. In various embodiments, the access checking routine may be implemented as a C function, a C++ method, a Java API, an SQL operator, etc.

Based on the name of the requested function in the target application 206, the access checking routine determines a security class that includes a function privilege for the requested function. To do so, the access checking routine may use the name of the requested function as a key, i.e., "viewCRMInfo( )" in the present example, to search a lookup table. This lookup table maps names of the functions to the security classes containing function privileges for the functions. Thus, based on the name of the function, the function privilege and the security class that includes the function privilege may be identified.

Once the security class that includes or defines the function privilege for the requested function is identified, one or more default ACLs that have been configured for the security class can also be identified. In some embodiments, the default ACLs can be readily identified for a security class simply based on the stored binding information for ACLs and security classes.

These default ACLs for the security class can be consulted to determine whether the subject has been granted the requested function privilege for the function. The access checking routine, for example, may determine that zero or more ACEs in the default ACLs for the security class are related to the subject and the requested function privilege. Any of the evaluation rules discussed previously may be used in this evaluation of the ACEs. Based on the result of this evaluation, the access checking routine may provide an indication (e.g., a return code, a status, a handle, a pointer, etc.) as to whether the subject should be granted or denied the requested function privilege.

For the purpose of illustrating a clear example, it has been described that the requesting application 204 and the target application 206 are two different applications. It should be noted that both the requesting application 204 and the target application 206 may be the same application. For example, in some embodiments, a function in the application 206 may be protected so that all subjects seeking to invoke the function, within the application or without, are required to be determined whether or not a requesting subject has been granted a function privilege for the function.

For the purpose of illustrating a clear example, it has been described that the requested resource is a function in the target application 206 and that a privilege for the requested function is a function privilege. It should be noted that a subject may request more than one resource at a given time. Furthermore, a privilege for the requested resource(s) may be an aggregate privilege. For example, in some embodiments, the access checking routine may determine that a single aggregate privilege has been defined for the requested resource(s). Consequently, the access checking routine may determine whether the subject has been granted the aggregate privilege, in order to determine whether the subject can invoke a function or access a resource.

For the purpose of illustrating a clear example, it has been described that a security class may be constructed for a single application. It should be noted that a security class may be constructed for two or more applications, or for only a part of an application.

Example Process Flow

Figure 3:
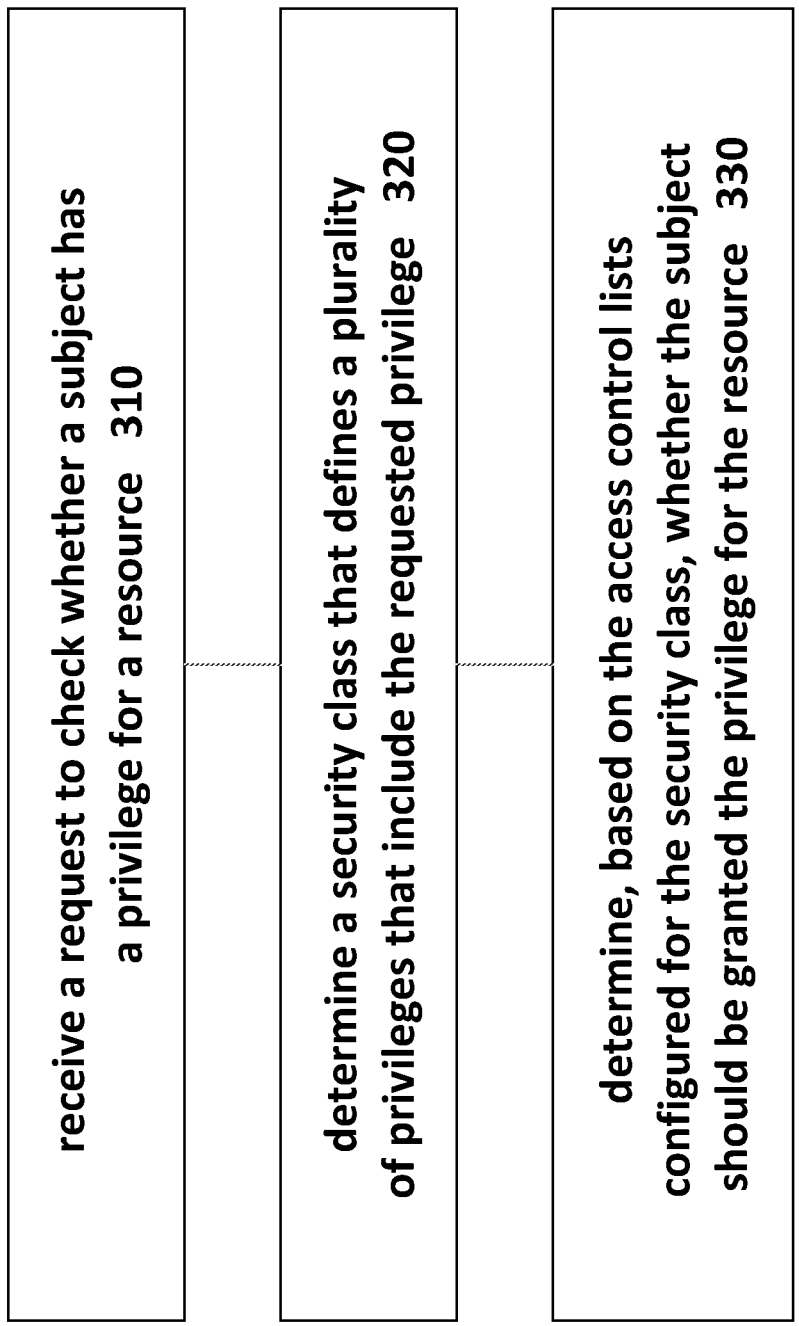
FIG. 3 is an example process flow for access control in an embodiment.

FIG. 3 illustrates an example process flow for access control. An access checking routine as described may implement this example process flow.

In block 310, the access checking routine receives a request to check whether a subject has been granted a privilege for a resource. The requested resource may be a function or an operation; the requested privilege is a function privilege to execute the operation. Alternatively, the requested privilege may be an aggregated privilege to execute the plurality of functions that includes the requested function(s).

In some example embodiments, the subject making the request for the function is a first application in a system or a user who is executing the first application, while the function is implemented in a second application in the system. For example, the first application may be a CRM application, while the second application may be a billing application.

In block 320, the access checking routine determines a security class that includes or defines a plurality of privileges that include the requested privilege. The security class may be configured for an application among a plurality of applications in the system.

One or more ACLs (e.g., default ACLs) may have been configured for the security class. Each of the one or more ACLs comprises one or more ACEs. Each of the one more ACEs in an ACL defines whether one or more subjects have been granted or denied to zero, one or more of the plurality of privileges included in the security class.

In block 330, the access checking routine determines, based on the ACLs configured for the security class, whether the subject should be granted the privilege for the resource. In response to determining, based on the ACLs configured for the security class, that the subject has been granted the privilege for the resource, the access checking routine may provide a positive indication to the request. On the other hand, in response to determining that the subject has not been granted the privilege for the resource, the access checking routine may provide a negative indication to the request.

In some embodiments, an application may implement additional access control to the requested privilege. Here, the term "additional" means that the access control as represented by this example process flow may be enhanced, augmented, or supplemented by application specific implementation of access control by the application. It should be understood that the additional application-specific access control is optional and may use additional ACLs than those default ACLs configured for the security classes of the system.

Since there may be a plurality of security classes in the system and a plurality of ACLs, the system described herein supports an administrative mechanism for one, two or more administrators to configure the plurality of security classes, the plurality of ACLs, and a plurality of bindings between the plurality of security classes and the plurality of ACLs. For example, the Billing application may designate its own administrators to manage a set of default ACLs that are mapped to security classes for privileges in the Billing application. This holds true for other types of applications.

In embodiments where aggregate privileges as described above may be defined, in the example process flow of FIG. 3, the access checking routine may determine whether the requested privilege is an aggregate privilege that is an aggregate of two or more constituent privileges. In some embodiments, in response to determining that the requested privilege is an aggregate privilege, the access checking routine determines whether the subject should have the aggregate privilege by determining whether the subject has all of the two or more other privilege individually. In some other embodiments, in response to determining that said requested privilege is an aggregate privilege that is an aggregate of two or more constituent privileges, the access checking routine may determine whether the subject should have the aggregate privilege by either (a) determining whether the subject has all of the two or more other privilege individually or (b) determining whether the subject has said aggregate privilege directly.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in storage median accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that grants the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, steps of the method comprising:
   establishing a plurality of security classes for a plurality of applications, each security class of said plurality of security classes defining a plurality of privileges for an application of the plurality of applications, wherein privileges defined in at least one security class in said plurality of security classes include at least one aggregate privilege that is based on at least two constituent privileges;
   binding each access control list of a plurality of access control lists to a corresponding security class of said plurality of security classes, wherein said each access control list of said plurality of access control lists comprises one or more access control entries that each define whether a subject has any one or more of a plurality of privileges defined in the corresponding security class to which said each access control list is bound;
   in response to receiving a specific request to check whether a specific subject has been granted an aggregate privilege that is based on two or more constituent privileges, identifying a security class that defines a plurality of privileges that include the aggregate privilege, said security class belonging to said plurality of security classes;
   in response to identifying the security class, identifying one or more access control lists bound to the security class;
   determining, based on access control entries in the one or more access control lists bound to the security class, whether the specific subject has been granted the aggregate privilege;
   wherein said determining, based on access control entries in the one or more access control lists bound to the security class, whether the specific subject has been granted the aggregate privilege includes determining one of either (a) whether the specific subject has been granted all of the two or more constituent privileges individually or (b) whether the specific subject has been granted said aggregate privilege directly;
   wherein each of the steps of the method is performed by one or more computing devices.

2. The method of claim 1, wherein said two or more constituent privileges comprises a function privilege to execute an operation.

3. The method of claim 1, wherein said two or more constituent privileges comprises one or more data access rights to a data object.

4. The method of claim 1, wherein said specific subject is related to a first application and wherein said two or more constituent privileges comprises a privilege for accessing a resource that is implemented in a second application.

5. The method of claim 1, wherein said security class that defines said plurality of privileges that include the aggregate privilege is related to one or more other security classes by inheritance or by inclusion.

6. The method of claim 1, further comprising using a particular evaluation rule to evaluate said access control entries contained in said one or more access control lists.

7. The method of claim 1, wherein said determining, based on access control entries in the one or more access control lists bound to the security class, whether the specific subject has been granted the aggregate privilege includes determining whether the specific subject has been granted all of the two or more constituent privileges individually.

8. The method of claim 1, wherein said determining, based on access control entries in the one or more access control lists bound to the security class, whether the specific subject has been granted the aggregate privilege includes determining whether the specific subject has been granted said aggregate privilege directly.

9. A volatile or non-volatile machine-readable medium carrying one or more sequences of instructions which, when executed by one or more processors, cause the one or more processors to perform:
   establishing a plurality of security classes for a plurality of applications, each security class of said plurality of security classes defining a plurality of privileges for an application of the plurality of applications, wherein privileges defined in at least one security class in said plurality of security classes include at least one aggregate privilege that is based on at least two constituent privileges;

binding each access control list of a plurality of access control lists to a corresponding security class of said plurality of security classes, wherein said each access control list of said plurality of access control lists comprises one or more access control entries that each define whether a subject has any one or more of a plurality of privileges defined in the corresponding security class to which said each access control list is bound;

in response to receiving a specific request to check whether a specific subject has been granted an aggregate privilege that is based on two or more constituent privileges, identifying a security class that defines a plurality of privileges that include the aggregate privilege, said security class belonging to said plurality of security classes;

in response to identifying the security class, identifying one or more access control lists bound to the security class;

determining, based on access control entries in the one or more access control lists bound to the security class, whether the specific subject has been granted the aggregate privilege;

wherein said determining, based on access control entries in the one or more access control lists bound to the security class, whether the specific subject has been granted the aggregate privilege includes determining one of either (a) whether the specific subject has been granted all of the two or more constituent privileges individually or (b) whether the specific subject has been granted said aggregate privilege directly.

10. The medium of claim 9, wherein said two or more constituent privileges comprises a function privilege to execute an operation.

11. The medium of claim 9, wherein said two or more constituent privileges comprises one or more data access rights to a data object.

12. The medium of claim 9, wherein said specific subject is related to a first application and wherein said two or more constituent privileges comprises a privilege for accessing a resource that is implemented in a second application.

13. The medium of claim 9, wherein said security class that defines said plurality of privileges that include the aggregate privilege is related to one or more other security classes by inheritance or by inclusion.

14. The medium of claim 9, wherein the one or more sequences of instructions further comprise instructions which, when executed by one or more processors, cause the one or more processors to perform using a particular evaluation rule to evaluate said access control entries contained in said one or more access control lists.

15. The medium of claim 9, wherein said determining, based on access control entries in the one or more access control lists bound to the security class, whether the specific subject has been granted the aggregate privilege includes determining whether the specific subject has been granted all of the two or more constituent privileges individually.

16. The medium of claim 9, wherein said determining, based on access control entries in the one or more access control lists bound to the security class, whether the specific subject has been granted the aggregate privilege includes determining whether the specific subject has been granted said aggregate privilege directly.

* * * * *

UNITED STATES PATENT AND TRADEMARK OFFICE
CERTIFICATE OF CORRECTION

PATENT NO. : 8,732,847 B2
APPLICATION NO. : 12/551217
DATED : May 20, 2014
INVENTOR(S) : Keefe et al.

Page 1 of 1

It is certified that error appears in the above-identified patent and that said Letters Patent is hereby corrected as shown below:

On the Title page, column 2, under abstract, line 7, After "one" insert -- or --.

In the Specification

Column 8, line 44, after "one" insert -- or --.

Signed and Sealed this
Seventh Day of October, 2014

Michelle K. Lee
*Deputy Director of the United States Patent and Trademark Office*